Sept. 3, 1968  M. STEINER  3,399,796

SAFETY STOPPER FOR PHARMACEUTICAL BOTTLES AND FLASKS

Filed April 14, 1967

INVENTOR
MAURICE STEINER
BY
M. A. Hobbs
ATTORNEY

United States Patent Office 3,399,796
Patented Sept. 3, 1968

3,399,796
SAFETY STOPPER FOR PHARMACEUTICAL BOTTLES AND FLASKS
Maurice Steiner, 40 bis Ave. de Suffren, 75 Paris 15eme, France
Filed Apr. 14, 1967, Ser. No. 631,077
Claims priority, application France, Apr. 18, 1966, 57,981
2 Claims. (Cl. 215—9)

ABSTRACT OF THE DISCLOSURE

Safety sealing system for bottles and flasks having necks provided with means for closing with screw-caps and bayonet caps, comprising a stopper having at its base and beneath the zone which cooperates with the neck-closure means an elastically deformable portion and a locking member which is adapted to cooperate with said closure means for the purpose of preventing the rotation of said stopper as long as said deformable portion of the stopper is not subjected to a deformation stress which renders said locking member inoperative.

---

The present invention is concerned with stoppers of the screw or bayonet type for pharmaceutical bottles or flasks, such stoppers being provided with a locking system such that it is practically impossible for them to be opened by very young children.

In view of the large number of cases in which children are poisoned as a result of massive absorption of relatively toxic drugs attractively presented in the form of sugar-coated pills packed in glass or metal containers, many different types of safety sealing devices have already been proposed. However, known devices are complicated and therefore costly inasmuch as they usually call for glass vessels having special shapes and even for a special machine for the industrial fitting of stoppers.

The stopper in accordance with the invention is characterized in that it is provided at its base, that is to say below the zone which cooperates with the usual bottle-closure elements, with an elastically deformable portion fitted with a locking member which prevents any movement of rotation of the stopper when said portion is in the expanded state.

The elastic portion can be deformable in a direction parallel to the axis of the stopper and comprise two strips which are adapted to move for example in an upward direction within a lateral slot of the stopper. The locking member in this case can be constituted by a small segment of screw-thread so disposed as to come into the line of extension of the normal screw-thread only when the elastic portion is deformed.

The elastic portion can also be deformable at right angles to the axis and the locking member can be constituted by either one or two lugs engaged in recesses formed in the noncontinuous screw-thread of the bottle.

Further properties and advantages of the invention will become apparent from the following description of various embodiments of stoppers in accordance with the invention which are given solely by way of example and not in any limiting sense, reference being made to the accompanying drawings, in which.

Figure 1:
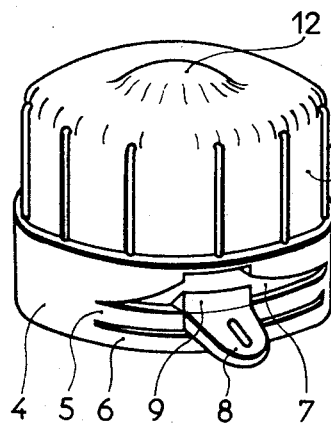
FIG. 1 is a perspective view of a stopper comprising lateral strips which permit of axial displacement.
Figure 2:
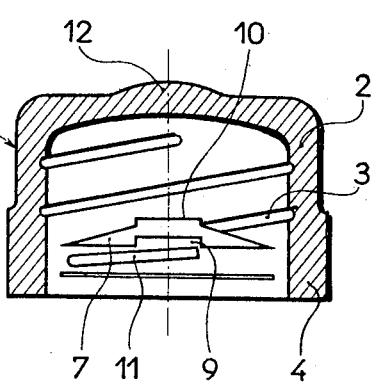
FIG. 2 is an axial sectional view of the stopper of FIG. 1.

In the example which is illustrated in FIGS. 1 and 2, the stopper 1 is of the screw-cap type and fabricated of relatively flexible or semirigid plastic material such as polyethylene, polypropylene or polyamide.

The upper portion 2 is of conventional shape and provided in its internal side wall with a screw-thread 3 which is adapted to engage the usual screw-thread formed on the neck of any standard bottle, flask or like pharmaceutical vessel, hereinafter referred to as a bottle. The said upper portion 2 has an extension in the form of a skirt 4 in which are formed two diametrically opposite strips 5 located between a portion 6 of the skirt which is of relatively substantial thickness and therefore rigid and a slot 7 which is cut in said skirt. Two projecting tongues 8 which are integral with the flexible strips 5 can be lifted parallel to the axis of the stopper by pressing underneath the said tongues with one finger. This upward motion is limited by a heel 9 which is adapted to cooperate with a square-topped notch or recess 10 formed in the slot 7.

Inside the stopper, the internal screw-thread 3 which cooperates with the screw-thread of the bottle has an extension on the flexible strip 5 of the stopper in the form of a screw-thread segment 11 which is displaced relative to the screw-thread 3 by one half-pitch, for example, and which can be brought into the line of extension of said screw-thread when an upward thrust is exerted by hand on the projecting tongues 8 and when the portion 9 of the strip 5 engages within the square-topped recess 10.

The operation of the safety stopper according to the invention is as follows:

In order to open the stopper, the user presses with his thumb on the central portion 12 of the top face of the stopper while firmly gripping the neck of the bottle between his forefinger and second finger, thus powerfully applying the two portions 9 within their recesses 10; thereupon, the stopper can be opened by turning in the usual manner since the screw-thread thus forms a continuous line.

On the contrary, if it is attempted to open the bottle simply by unscrewing—as a child would normally be expected to do—the stopper would jam and it would thus prove impossible to open the bottle. In fact, it would then be possible to release the stopper only by first partially rescrewing the stopper in order to free the screw-thread.

In order to close the bottle again, it is merely necessary to screw down while applying downward pressure.

The form of construction which has just been described is already particularly advantageous by virtue of the fact that the cost price of the stopper is practically equal to that of a screw-cap of the ordinary type formed of the same material and also by virtue of the fact that it can be employed on any bottle or flask without entailing any modification in the standard design or shape of glassware. However, it is possible in addition to obtain an undetachable stopper without thereby entailing any appreciable increase in capital cost.

With this object in mind, it is merely necessary to ensure that one of the two symmetrical square-topped recesses 10 is sealed by means of a tear-off strip having the same shape as said recess and provided with a pulling tab to facilitate its removal. As long as this operation has not been performed, it will be impossible to open the bottle since the movable portion of the stopper cannot be displaced. In order to close the bottle at works, the operation will be carried out by slightly compressing the stopper which has previously been heated, this operation being known per se.

Figure 3:
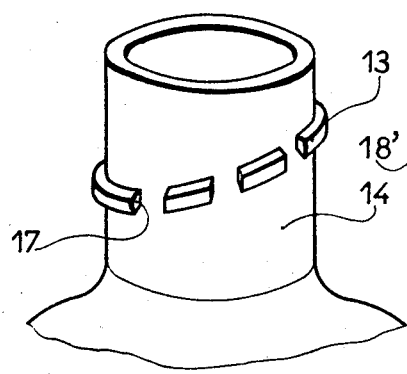
FIG. 3 is a perspective view of the neck of a bottle having an interrupted screw-thread.
Figure 4:
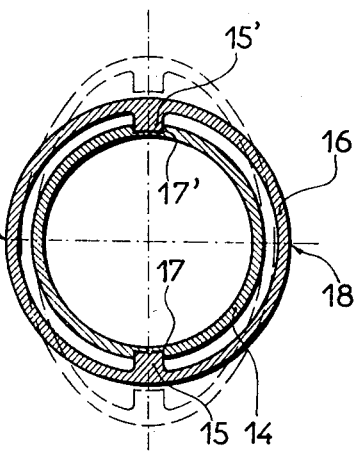
FIG. 4 is a transverse sectional view of a safety stopper which is intended to be placed on the bottle of FIG. 3.

In the example which is illustrated in FIGS. 3 and 4, the neck of the bottle is provided with a screw-thread 13 which is interrupted over a certain number of generatrices of the cylinder which forms the neck 14. The stopper is provided in addition to the ordinary female thread formed on its rigid portion with one or a number of lugs 15 which are formed on its flexible skirt 16. The internal diameter of said skirt is greater than the external diameter of the neck 14 and the lugs 15 are adapted to engage in spaces 17 formed by the interruptions of the screw pitch 13 and at the base of this latter.

In order to open the bottle by unscrewing the stopper, it is first necessary to press firmly on two portions 18, 18' of the stopper skirt 16, said skirt portions being located at the extremities of a diameter which is located at right angles to the diameter which extends between the two lugs 15, 15'. The skirt 16 is deformed, the lugs 15, 15' move out of their recesses 17, 17' and the rotation of the stopper becomes possible.

Figure 5:
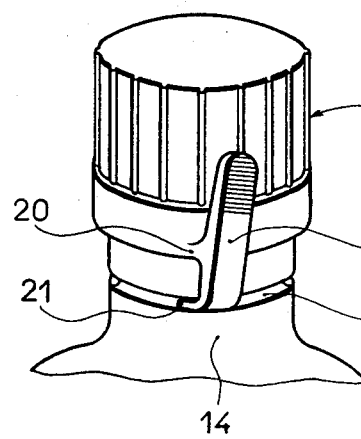
FIG. 5 is a perspective view of a stopper comprising levers which are adapted to cooperate with a groove formed in the neck of the bottle.

In the example of FIG. 5, the stopper 1 is provided at its base with two levers 19 joined by a flexible portion 20 which is deformable by torsion. When the stopper 1 is screwed home, the tongue-shaped extremity 21 of said flexible portion is engaged in a groove 22 formed in the neck 14 of the bottle. It is apparent that, in this embodiment, the stopper can be unscrewed only after having withdrawn the tongue-shaped extremity 21 from the groove 22 by pressing the top portion of the levers 19.

It is clear that, in order to open a bottle, the stoppers in accordance with the invention require not only a movement of rotation but a compressive effort or a pulling effort exerted by the user, who has to place his fingers in a position which is not usual, thus making it virtually impossible for a very small child to open the bottle.

Furthermore, should it be found necessary to make the opening action even more complicated for a child, for example for an older child who might otherwise discover the method of opening, provision can be made for an arrangement in which, instead of having to exert a pull on two projecting tongues, it is necessary to pull one tongue while depressing the other; alternatively, provision could be made for a third tongue, thereby entailing the use of both hands in order to unscrew the stopper.

Moreover, all of the stoppers according to the invention can be endowed with a foolproof system which dispenses with the need for any additional packaging such as a sealed box or tear-off capsule.

It is clearly understood that the invention is not limited to the constructional details which have been illustrated or described and which have been given solely by way of example. It accordingly follows that the skirt of the stopper could be provided with teeth which are adapted to engage with a toothed ring of the bottle neck.

What I claim is:

1. A closure cap for safety closing of a container having a neck and a conventional screw-thread formed on said neck, said closure cap including a top having an internal side wall provided with a screw-thread adapted to engage said conventional screw-thread of said container neck and further including a depending skirt, having an elastic portion deformable in a direction parallel to the axis of said cap, said elastic portion having its internal side wall provided with a screw-thread segment adapted to come in the line of extension of said cap top screw-thread only when said elastic portion is subject to an axial deformation stress.

2. A closure cap as claimed in claim 1, wherein said skirt is provided with at least one slot and at least one elastic strip adjacent to said slot and movable into said slot when subject to an axial deformation stress.

References Cited

UNITED STATES PATENTS

| | | | |
|---|---|---|---|
| 2,752,060 | 6/1956 | Martin | 215—9 |
| 2,827,193 | 3/1958 | Martin | 215—9 |
| 3,019,931 | 2/1962 | Thornton | 215—9 |
| 3,182,840 | 5/1965 | Polzin | 215—9 |
| 3,185,333 | 5/1965 | Sharp | 215—9 |
| 3,233,769 | 2/1966 | Jessop | 215—9 |

WILLIAM T. DIXSON, JR., *Primary Examiner.*